(12) United States Patent
Zang et al.

(10) Patent No.: US 8,559,926 B1
(45) Date of Patent: Oct. 15, 2013

(54) TELECOM-FRAUD DETECTION USING DEVICE-LOCATION INFORMATION

(75) Inventors: Hui Zang, Cupertino, CA (US); Travis E. Dawson, San Francisco, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 12/986,708

(22) Filed: Jan. 7, 2011

(51) Int. Cl.
*H04M 1/66* (2006.01)

(52) U.S. Cl.
USPC ........ 455/411; 455/410; 455/404.2; 455/405; 455/421

(58) Field of Classification Search
USPC ...................... 455/410, 411, 404.2, 405, 421
See application file for complete search history.

(56) References Cited

U.S. PATENT DOCUMENTS

| | | | | |
|---|---|---|---|---|
| 5,839,063 | A * | 11/1998 | Lee ................................ | 455/410 |
| 6,097,938 | A * | 8/2000 | Paxson .......................... | 455/410 |
| 6,542,729 | B1 * | 4/2003 | Chmaytelli et al. ........... | 455/410 |
| 2003/0045270 | A1 * | 3/2003 | Agrawal et al. ............... | 455/410 |
| 2009/0253410 | A1 * | 10/2009 | Fitzgerald et al. ............ | 455/411 |

FOREIGN PATENT DOCUMENTS

EP 0981068 1/1999

OTHER PUBLICATIONS

Burge, Peter, et al., Detecting Cellular Fraud Using Adaptive Prototypes., Department of Computer Science, Royal Holloway University of London, England., 1997.
Burge, Peter, et al., Fraud Detection and Management in Mobile Telecommunications Networks., Royal Holloway University of London, England.
Fawcett, Tom, et al., Adaptive Fraud Detection, NYNEX Science and Technology, White Plains, NY., 1997.
Fawcett, Tom, et al., Activity Monitoring: Noticing interesting changed in behavior., Bell Atlantic Science and Technology, White Plains, NY., 1999.
Moreau, Yves, et al., A hybrid system for fraud detection in mobile communications., 1999.
Britos, Paola, et al., Unusual Changes of Consumption Detection in Mobile Phone Users, Software & Knowledge Engineering Center Graduate School, Buenos Aires Institute of Technology, 2006.
Gopal, Rupesh, K., et al., A Rule-based Approach for Anomaly Detection in Subscriber Usage Pattern, 2007.

* cited by examiner

*Primary Examiner* — Kwasi Karikari (57) ABSTRACT

Subject matter described herein is directed to detecting unauthorized use, such as by a cloned mobile device, of wireless telecommunication services. Mobile-device locations are analyzed to detect outlying locations, such as locations that lack a call relationship with other locations or that are greater than a threshold distance away from other locations. Outlying locations might be detected when more than one discrete location cluster exists among a plurality of mobile-device locations, the discrete clusters having respective locations that are not related by way of a call and that fail to satisfy a threshold distance. Outlying locations or multiple discrete locations clusters suggest an unauthorized use of a mobile device's account.

18 Claims, 7 Drawing Sheets

TELECOM-FRAUD DETECTION USING DEVICE-LOCATION INFORMATION

SUMMARY

Embodiments of the invention are defined by the claims below, not this summary. A high-level overview of various aspects of the invention are provided here for that reason, to provide an overview of the disclosure, and to introduce a selection of concepts that are further described in the detailed-description section below. This summary is not intended to identify key features or essential features of the claimed subject matter, nor is it intended to be used as an aid in isolation to determine the scope of the claimed subject matter.

At a high level, subject matter described herein includes ways of detecting fraud in a telecommunications environment. Mobile-device locations are analyzed to detect outlying locations, such as locations that lack a call relationship with other locations or that are greater than a threshold distance away from other locations. Outlying locations suggest an unauthorized use of a mobile device's account.

BRIEF DESCRIPTION OF THE DRAWINGS

Illustrative embodiments of the present invention are described in detail below with reference to the attached drawing figures, wherein.

DETAILED DESCRIPTION

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly stated.

Embodiments of our technology may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. Computer-readable media include media implemented in any way for storing information. Examples of stored information include computer-useable instructions, data structures, program modules, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
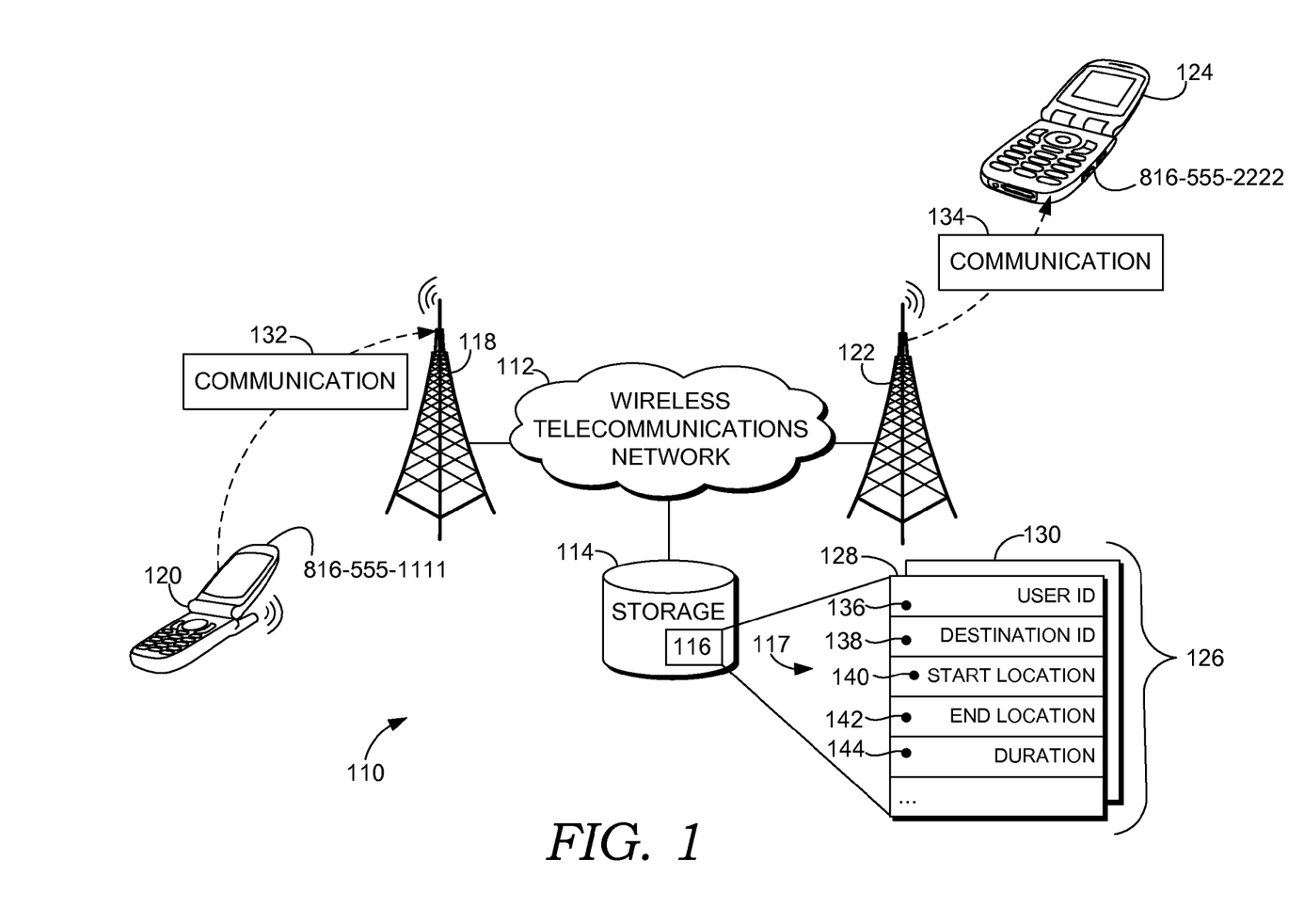
FIG. 1 depicts an exemplary operating environment in accordance with an embodiment of the present invention.

Referring now to FIG. 1, an exemplary operating environment suitable for practicing an embodiment of the technology is depicted and identified generally by reference numeral 110. Operating environment 110 includes a wireless telecommunications network 112. Wireless telecommunications network 112 is capable of communicating various technologies, such as CDMA, GPRS, GSM, and WiMAX.

Various components depicted in operating environment 110 communicate by way of wireless telecommunications network 112. One such component includes a first base transceiver station or tower 118. Base station 118 is capable of wirelessly communicating with a first mobile device 120. Similarly, a second base transceiver station or tower 122, which communicates with base station 118 by way of wireless communication network 112, can communicate with a second mobile device 124. Moreover, mobile devices 120 and 124 can communicate with one another using towers 118 and 122 and wireless communication network 112. For example, mobile device 120 might send a communication 132, such that mobile device 124 receives a communication 134. Communication 132 might be sent in a variety of contexts. For example, mobile device 120 might initiate a voice call, send an instant message or a text message, send an email, or send a voicemail. Although FIG. 1 depicts a communication being exchanged between two mobile devices, a communication might also include a request by mobile device 120 to send or receive data (e.g., web content), the delivery of which is facilitated by network 112.

In one embodiment, wireless telecommunications network 112 is coupled to storage 114. Storage 114 includes information 116, which is depicted in an exploded view 117 for illustrative purposes. Exploded view 117 includes a set of communication records 126. Set 126 includes individual communication records 128 and 130 that include communication attributes (e.g., user id, destination id, start location, end location, duration, etc). Each record of communication information corresponds to a respective communication, such as communication 132. A respective communication corresponding to each record 128 and 130 might include various types of communication. For example, as previously indicated, a communication might include a voice call, instant message or a text message, a voicemail, a data call (i.e., process of receiving and/or sending data), or a combination thereof. Sometimes, communication information is referred to as Call Data Records (CDR).

For illustrative purposes, communication record 128 corresponds to communication 132 and 134. That is, record 128 is generated in response to communications 132 and 134 and includes various communication attributes that describe communications 132 and 134. In one embodiment of the present invention, communication record 128 includes a user identifier 136, which identifies a user, a mobile device, an account, or a combination thereof. That is, since device 120 engaged in communication 132 and record 128 is created to describe communication 132, user identifier 136 identifies device 120, a user of device 120, or an account that device 120 is authorized to use to access network 112. User identifier 136 might also identify an account, which authorizes device 120 to utilize services of wireless telecommunications network 112. Moreover, communication record 128 includes other fields that are associated with and that describe communication 132. For example, other fields include a destination identifier 138 corresponding to another endpoint of communication 132 (i.e., the destination of an outgoing call or the origination of an incoming call); a start location 140 representing a location of mobile device 120 when communication 132 was initiated; an end location 142 representing a location of mobile device 120 when communication 132 was terminated or completed; and a duration 144 of communication 132. An exemplary start location or end location might include a BTS identifier, a cell, a sector, a city, a zip code, a state, a geographical coordinate, or a combination thereof. These fields are exemplary and other embodiments might include more, fewer, or different fields in each communication record.

Figure 2:
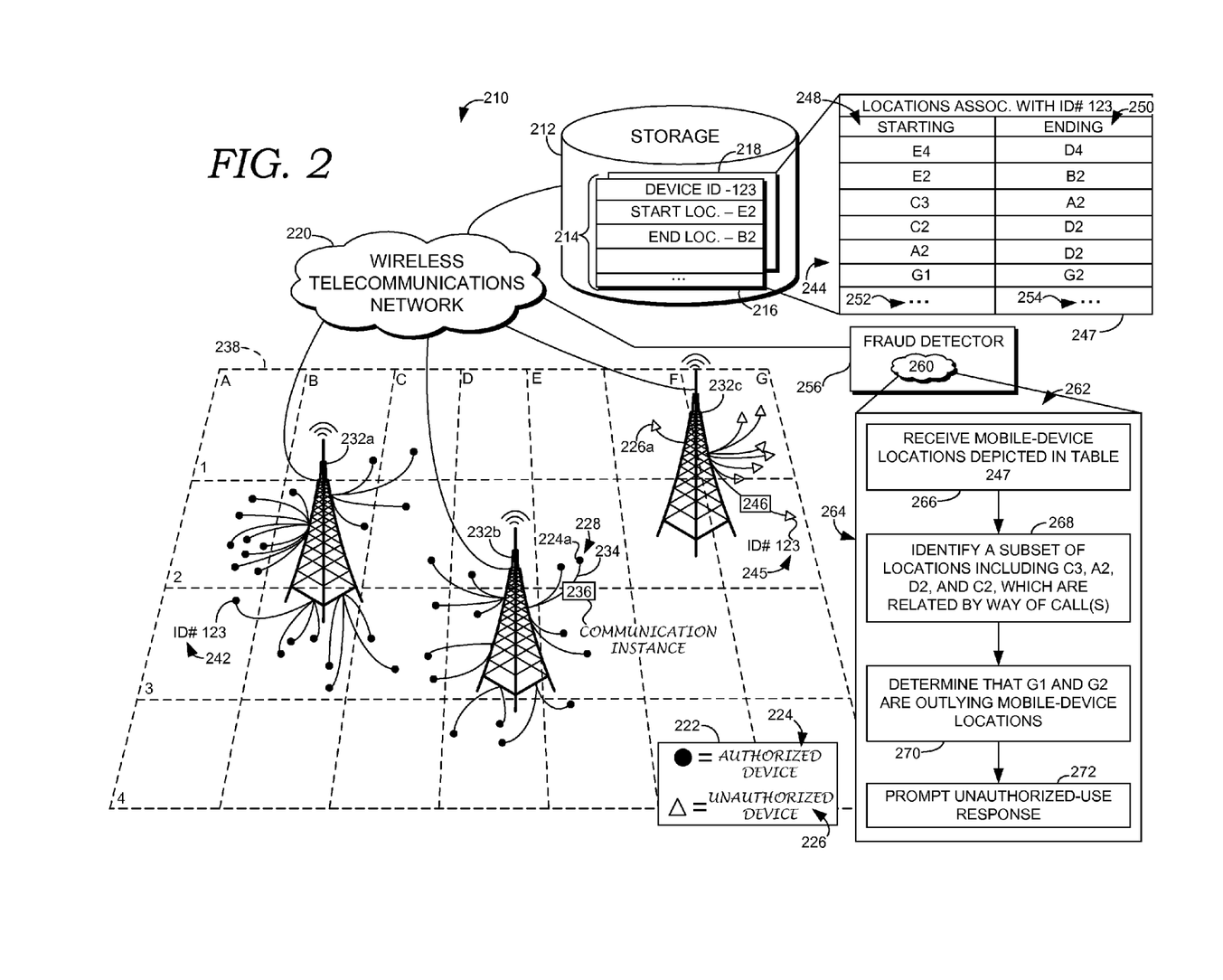
FIG. 2 depicts another exemplary operating environment in accordance with an embodiment of the present invention.

Referring now to FIG. 2, an operating environment is depicted and is identified generally by reference numeral 210. Subject matter depicted in environment 210 leverages communication records and the attributes included therein, such as set 126 and individual records 128 and 130 that were described with respect to FIG. 1. For example, as will be described in more detail herein, fraud detector 256 analyzes communication records to detect possible fraudulent activity (i.e., fraud detector 256 includes application 260 that, when executed, facilitates a method of detecting possible fraudulent activity).

Communication records and attributes are depicted in FIG. 2 and are identified generally as set 214, which includes records 216 and 218. While for illustrative purposes only two records are depicted in set 214, set 214 might include several additional (e.g., hundreds, thousands, etc.) records. Also, while for illustrative purposes each record only depicts id information and location information, each record might also include several other categories of information, such as those described with respect to FIG. 1.

FIG. 2 includes various elements that communicate with one another, such as wireless telecommunications network 220, storage 212, fraud detector 256, towers 232*a-c*, and mobile devices. FIG. 2 depicts two different mobile devices that are identified in legend 222 as "authorized device" and "unauthorized device" and that are positioned throughout a grid 238. That is, the mobile device that is represented at various positions as a filled-in circle (e.g., 224*a*) is deemed an authorized device, whereas the mobile device that is represented at various positions as a triangle (e.g., 226*a*) is deemed an unauthorized device. Throughout this description the authorized device will be identified by reference numeral 224, and the unauthorized device will be identified by reference numeral 226.

In FIG. 2, each line connecting a symbol (i.e., filled-in circle or triangle) to a tower 232*a-c* represents a communication instance. For example, line 234 indicates that mobile device 224 is engaging in a communication instance 236. As such, FIG. 2 depicts mobile devices 224 and 226 engaging in various communication instances at different instances in time and at different geographical locations. That is, the communication instances take place at various locations within a geographic region, which is depicted by grid 238. For example, grid 238 includes a location 228 at which mobile device 224 engages in communication instance 236. Each of the other depictions of mobile device 224 and 226 include a respective location at which mobile device 224 or 226 engages in a different communication instance.

Typically, in order for mobile device 224 to utilize services provided by wireless telecommunications network 220, mobile device 224 establishes an account with a network provider (not shown). Such an account allows terms-of-service to be established and allows the network provider to track use of network services by mobile device 224. Generally, an account identifies one or more mobile devices that are authorized to use services, i.e., when an authorized device uses services, the services are attributable or chargeable to the account. Mobile device 224 includes an identifier 242 (i.e., "ID#123") that is transmitted by mobile device 224 to network 220 each time mobile device 224 engages in a communications instance. Identifier 242 enables network 220 to recognize mobile device 224 and attribute network use by mobile device 224 to an account of mobile device 224. Examples of an identifier include an ESN, MIN, or phone number.

An unauthorized device includes a device that utilizes services of wireless telecommunications network 220 in a manner that attributes the use to an account of a different mobile device. Unauthorized device 226 deceives network 220 to attribute use of network services by device 226 to an account on which unauthorized device 226 is not approved. That is, unauthorized device 226 might be programmed to transmit a copy of identifier 242 of mobile device 224 when device 226 engages in a communications instance. For example, when mobile device 226 engages in communications instance 246, mobile device 226 transmits identifier 245 ("ID#123"), which is a copy of the same identifier assigned to mobile device 224. Therefore, mobile device 226 deceives network 220 into attributing use of network services to process communications instance 246 to an account of mobile device 224. Such unauthorized devices are sometimes referred to as "cloned" mobile devices.

When mobile device 224 or 226 engages in a communications instance (e.g., 236 or 246) a communication record is generated and maintained in storage 212. For example, set 214 includes record 216, which is generated in response to a communications instance. Record 216 includes information that is specific to a particular communications instance. For example, record 216 includes a device identifier, a start location, and an end location. For illustrative purposes, record 216 is generated as a result in-part of communications instance 236, such that record 216 lists the location 228 (i.e., "E2") at which communications instance 236 was initiated and the device identifier (i.e., "ID#123") of mobile device 224. Moreover, communication record 216 might include several other instance attributes that are not depicted, such as a start time, an end time, and a communication type (e.g., text message, incoming voice call, outgoing voice call, voice message, and data request).

For illustrative purposes herein, set 214 includes records 216 and 218 that are generated by communication instances of mobile device 224 or 226. Although only two records 216 and 218 are depicted in FIG. 2, set 214 might include several (e.g., hundreds, thousands, etc.) more records, each of which describes a communication instance of mobile devices 224 or 226. Because mobile device 226 represents itself using identifier 245, which is a copy of the same as identifier 242 of mobile device 224, records generated by mobile device 224 and 226 are grouped together by network 220 under ID#123 for analysis purposes.

For illustrative purposes, an exploded view 244 depicts information that is included among set 214. Exploded view 244 includes a set of communication-instance locations that are associated with ID#123 and that are arranged in a table 247. Therefore, table 247 includes locations at which both mobile device 224 (authorized) and mobile device 226 (unauthorized) engaged in communications instances.

A communication-instance location might include a location at which a communication instance is initiated, such as those locations in column 248. Alternatively, a communication-instance location might include a location at which a communication instance ends or is terminated, such as those locations listed in column 250. Typically, each communications record (e.g., 216 or 218) will include both a start location and an end location, which are listed in a same row in exploded view 244. Locations might be indicated with varying degrees of specificity. For example, a location might be indicated using a set of geographical coordinates, a cell identifier, a cell-sector identifier, and a base-station location. Locations in exploded view 244 are depicted as grid coordinates that correspond with grid 238. Although a limited quantity of locations is depicted in FIG. 2, set 214 might include several additional locations as indicated by ellipses 252 and 254. For example, table 247 might include all of those locations depicted on grid 238 at which mobile device 224 and 226 engaged in communications instances.

Figure 3:
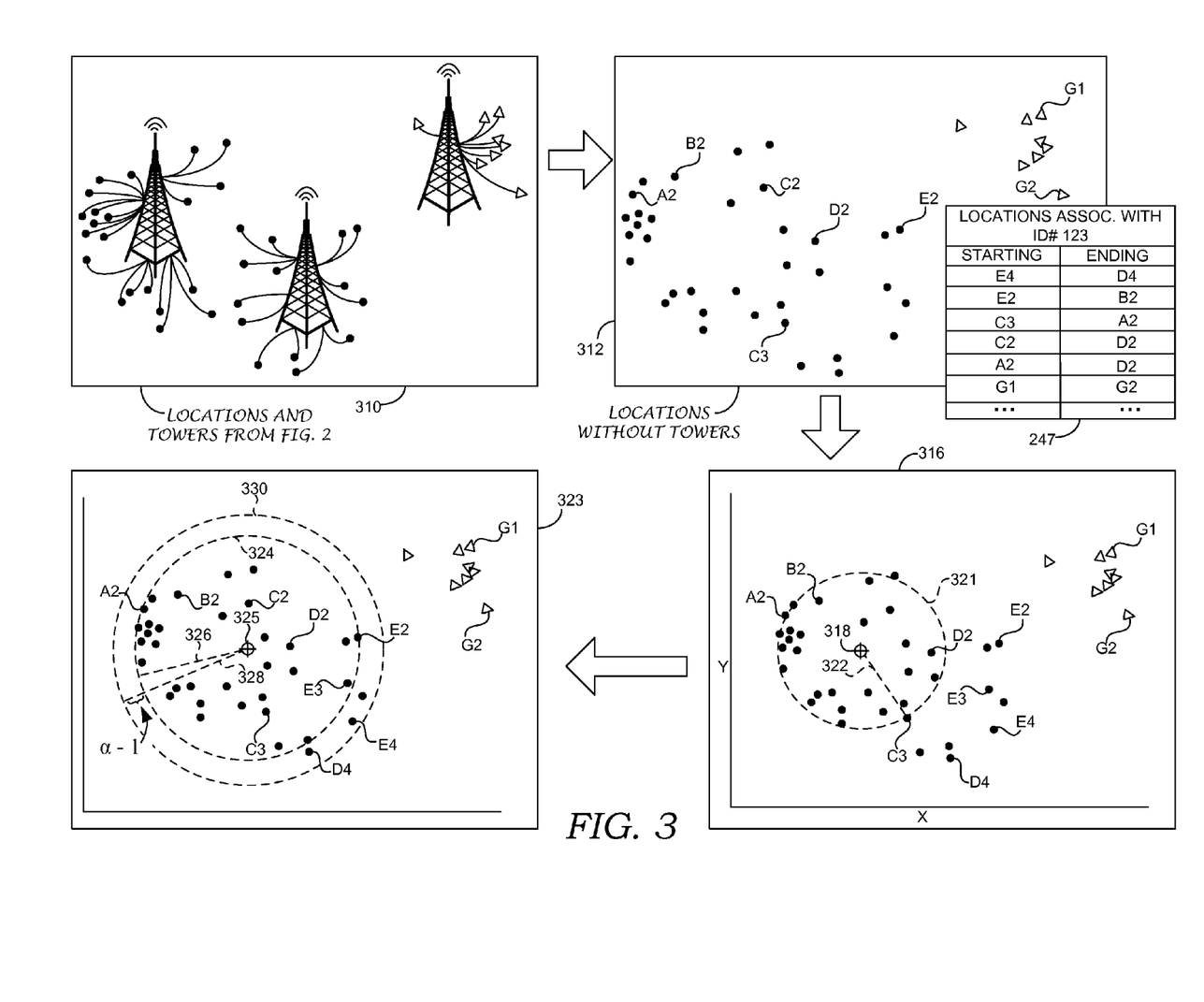
FIGS. 3 and 4 depict geographical-analysis steps taken in accordance with an embodiment of the present invention.

Fraud detector 256 analyzes communication attributes in set 214 that are associated with "ID#123," and for exemplary purposes, fraud detector 256 receives locations on grid 238 at which mobile device 224 and 226 engaged in communications instances. Referring to FIGS. 2 and 3, towers 232*a-c* and locations depicted on grid 238 are depicted in box 310. In addition, the plurality of locations depicted on grid 238 is depicted without towers 232*a-c* in box 312. A version of table 247 of FIG. 2 is also depicted in FIG. 3 and is similarly identified by reference numeral 247. Fraud detector 256 applies various analytical steps to locations depicted in box 312 to determine whether a device identifier (e.g., ID#123) that identifies an authorized mobile device (e.g., 224) has been used by an unauthorized mobile device (e.g., 226) to utilize telecommunication services. Locations are depicted in boxes 310, 312, 316, and 322 in a plotted fashion for illustrative and explanatory purposes; however, such plotting is not required for fraud detector 256 to analyze the locations.

In one embodiment, fraud detector 256 determines whether call relationships exist between locations or groups of locations included among locations in box 312. A "call relationship" exists between a first location and a second location when a communications instance either starts at the first location and ends at the second location or starts at the second location and ends at the first location. For example, table 247 depicts that a call relationship exists between location E2 and location B2 because a communications instance (e.g., 236) started at E2 and ended at B2.

By applying such call-relationship analysis to locations in box 312, a subset of locations might be deemed related by various degrees of separation. For example, because location A2 and location D2 share a call relationship and location A2 and C3 share a call relationship (as depicted in table 247), location D2 and location C3 share a call relationship by way of location A2. Moreover, because location C2 and location D2 share a call relationship (as depicted in table 247) and location D2 shares a relationship with location C3 by way of location A2, location C2 and location C3 share a call relationship. In this respect, groups of related locations can be merged based on a single call relationship between two locations. Accordingly, fraud detector 256 identifies a subset of locations that are related by way of calls. This subset of locations that are related by way of calls might also be referred to herein as a cluster.

In a further embodiment, referring to box 316, fraud detector 256 determines an approximate center of a geographical grouping of the subset of locations related by way of calls. For example, if A2, C3, and D2 are in a subset (i.e., are deemed related by way of calls), point 318 in box 316 represents an approximate center of the subset. An approximate center might be calculated using various techniques. For example, fraud detector 256 might represent each of locations A2, C3, and D2 as a respective first coordinate and a respective second coordinate. Box 316 depicts an x-y coordinate plane for illustrative purposes. Fraud detector might calculate an average first-coordinate mean based on all respective first coordinates of A2, C3, and D2 and calculate a second-coordinate mean based on all respective second coordinates of the subset. As such, the approximate center might be represented by the first-coordinate mean and the second-coordinate mean. While for illustrative purposes, the subset is described to include A2, C3, and D2, the subset might include a much larger number of locations.

Additionally, a maximum distance is found between the approximate center and a point of the subset (e.g., A2, C3, and D2). For example, radius 322 has been identified in box 316. The maximum distance (i.e., radius) might be deemed a threshold value and a determination is made as to whether any other locations, which might not have possessed a call relationship with A2, C3, or D2, are located a distance away from the approximate center 318 that is equal to, or less than, the threshold value. For example, B2 is located a distance away from approximate center 318 that is less than radius 322, as evidenced by B2 being located inside circle 321. As such, B2 is added to the cluster of A2, C3, and D2. In addition to B2, all of the other unlabeled filled-in circles in box 316 that are located a respective distance away from approximate center 318 that is less than radius 322 are also added to the group of A2, C3, D2, and B2 (i.e., all other unlabeled filled-in circles that are within circle 321. Moreover, any locations that have been deemed related to B2 (or any of the unlabeled filled-in circles), such as E2 according to table 247, are also added to the cluster.

Accordingly, box 323 depicts a larger circle 324 that encompasses the newly added locations. A radius 326 of circle 324 is determined to identify any other locations (e.g., E3) that are within a threshold distance away from a center 325. In a further embodiment, radius 326 is multiplied by a constant $\alpha$ to increase the area in which locations are deemed related to a cluster or subset (e.g., A2, C3, D2, B2, E2, and E3). (Although not depicted in FIG. 3, radius 322 could also be multiplied by the constant $\alpha$ to increase the area in which locations can be deemed related.) The constant $\alpha$ is modifiable and might be heuristically determined to achieve a desired sensitivity level of fraud detector 256. For example, setting constant $\alpha$ to a value of 1.0 will achieve higher sensitivity than setting constant $\alpha$ to a value greater than 1.0. An increased threshold value is represented by line 328, thereby extending an area that is included within circle 330. Because locations D4 and E4 are located within circle 330, D4 and E4 (and any locations related directly or indirectly to D4 and E4 by way of calls) are added to the subset.

In one embodiment, steps of adding to the subset and increasing the area might be repeated until no new locations are discovered that satisfy the above stated criteria (i.e., call relationship or within a threshold distance). For example, when analyzing location G1, it might be determined that location G1 has a call relationship with G2. Moreover, it might be determined that neither G1 nor G2 have a call relationship with any location included within the subset (i.e., those locations included within circle 330). In addition, a determination might be made that neither G1 nor G2 are located within a threshold distance (e.g., radius multiplied times a constant) away from an approximate center of a geographical grouping of the subset. Based one or more of these characteristics (i.e., lacking a call relationship and not being located within the threshold distance), locations G1 and G2 might be deemed "outlying locations."

Figure 4:
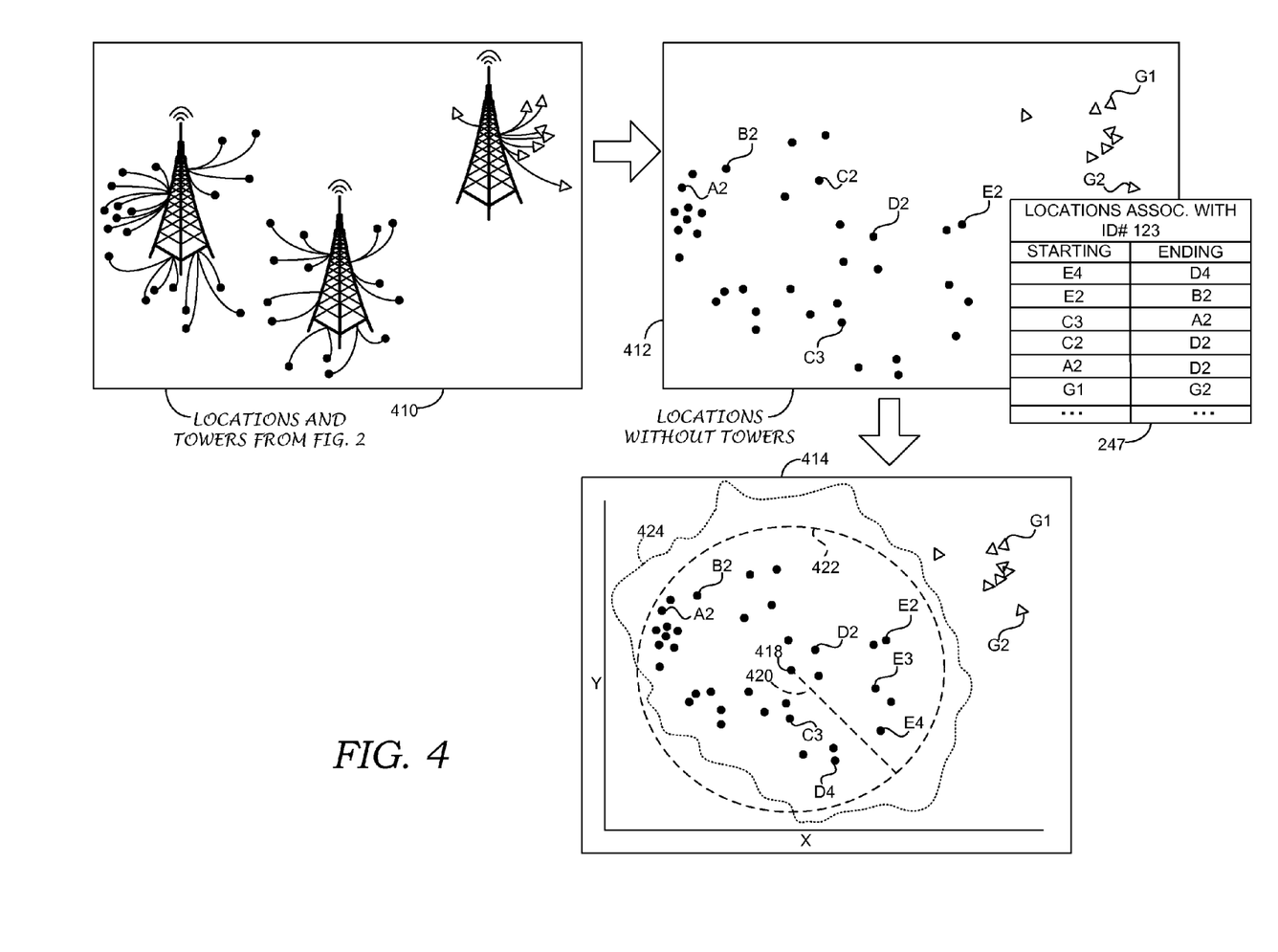

In another embodiment, fraud detector 256 might consider distance attributes of locations. For example, referring to FIG. 4, boxes 410 and 412 are similar to boxes 310 and 312 of FIG. 3; however, boxes 414 and 416 depict alternative analysis. That is, referring to FIGS. 2 and 4, towers 232*a-c* and locations depicted on grid 238 are depicted in box 410. In addition, the plurality of locations depicted on grid 238 is depicted without towers 232a-c in box 412. A version of table 247 of FIG. 2 is also depicted in FIG. 4 and is similarly identified by reference numeral 247. Fraud detector 256 applies various analytical steps to locations depicted in box 412 to determine whether a device identifier (e.g., ID#123) that identifies an authorized mobile device (e.g., 224) has been used by an unauthorized mobile device (e.g., 226) to utilize telecommunication services. Locations are depicted in boxes 410, 412, 414, and 416 in a plotted fashion for illustrative and explanatory purposes; however, such plotting is not required for fraud detector 256 to analyze the locations.

In one embodiment, fraud detector 256 selects a location from among the locations depicted on grid 238. For example, fraud detector might select location 418 in box 414 of FIG. 4. A cluster-defining threshold distance ("threshold distance) is used to identify other locations that might be related to location 418. A threshold distance might include a heuristically determined distance that has been shown to identify related locations. For example, radius 420 represents such a threshold distance. In addition, a threshold distance might be a geographical boundary, such as a city boundary, county boundary, or state boundary. For example, circumference 422 might represent such a threshold distance. Although circumference 422 is a regular shape (e.g., circle) a threshold distance might include a boundary of an irregular shape 424 consistent with a boundary of a town, city, state, or other incorporation.

Accordingly, fraud detector 256 identifies locations from among the plurality of locations that satisfy the threshold distance (e.g., are included within the threshold distance (e.g., 420, 422, or 424)). For example, fraud detector 256 might determine that all of the locations represented by filled-in circles are within the cluster-defining distance. A distance-based cluster is created that represents locations represented by filled-in circles. As described above, a constant (e.g., alpha) might be applied to a cluster to adjust a sensitivity level.

Fraud detector 256 might perform this distance analysis for some or all of the locations included in the plurality. For example, fraud detector determines a distance-based cluster to which location G1 belongs. If G1 belongs to a distance-based cluster, which is different than the distance-based cluster representing the filled-in circles, G1 might be identified as an outlying location and the presence of more than one discrete location might be detected. In an alternative embodiment, fraud detector 256 combines the distance-based analysis described with respect to FIG. 4 with call-relationship analysis, such as that described with respect to FIG. 3.

Figure 5:
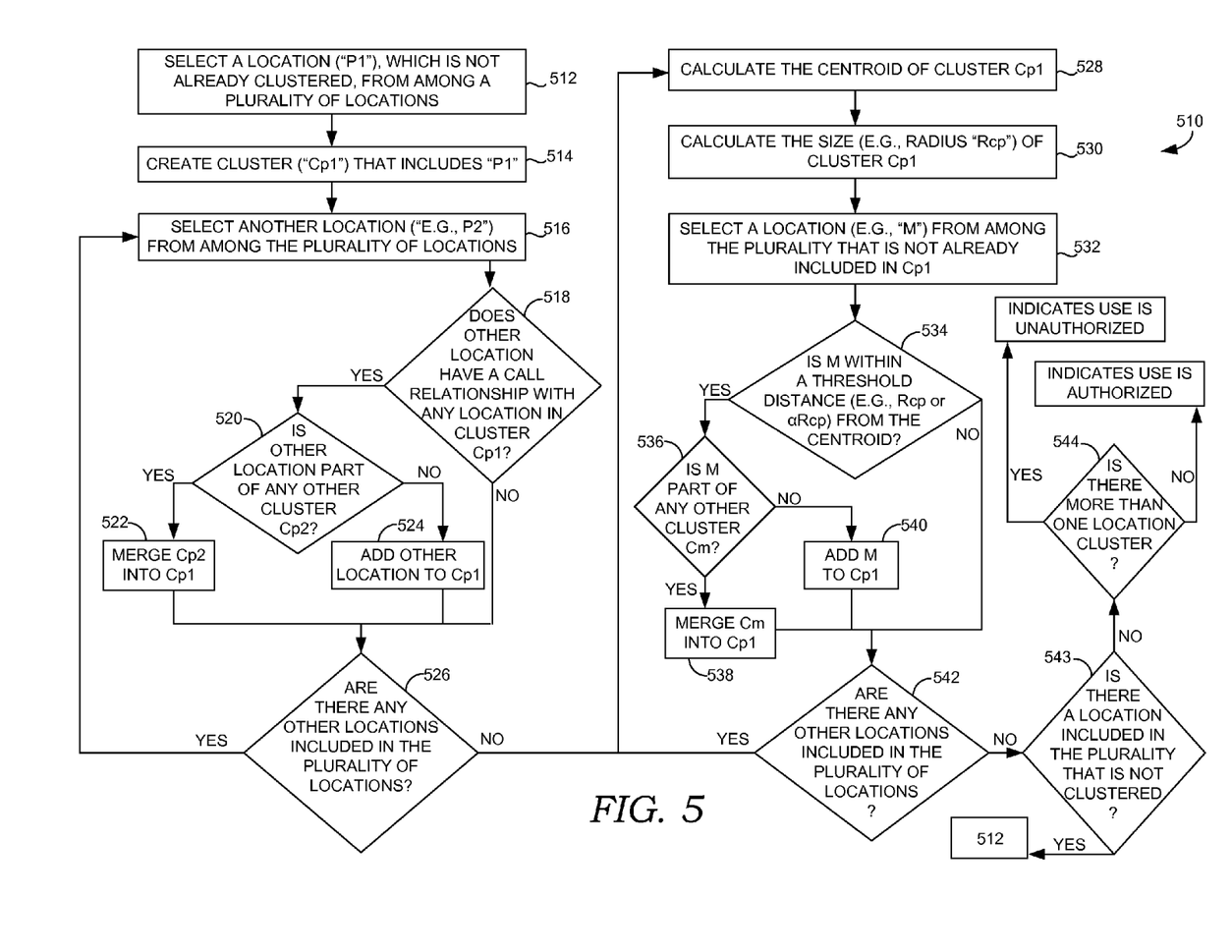
FIGS. 5-7 depict flow diagrams in accordance with an embodiment of the present invention.

Referring now to FIG. 5, a flow diagram 510 is depicted that outlines an algorithm in accordance with an embodiment of the invention. The algorithm depicted by FIG. 5 includes some of the steps described depicted by FIGS. 3 and 4. At 512, from among a plurality of locations, a single location ("P1") is selected that is not clustered. That is, a single location is selected that has not already been deemed part of another cluster based on a prior execution of the algorithm. For example, location C3 identified in box 316 of FIG. 3 might be selected from among the plurality of locations included in table 247. At 514 a cluster (Cp1) is created to include P1. Step 516 includes selecting another location (e.g., P2) from among the plurality of locations, such as A2 which is also included in table 247 and is depicted in box 316 of FIG. 3. At 518 a determination is made as to whether P2 (i.e., the selected other location) has a call relationship with P1 or with any other location included in cluster Cp1. That is, although in the first execution of step 518, cluster "Cp1" might only include P1, in subsequent iterations of step 518, Cp1 might include locations in addition to P1 that have been deemed related to P1 by way of a call and that are compared to P2 to identify any call relationships.

If P2 has a call relationship with P1 or any other location in cluster Cp1, then another determination is made at 520 as to whether P2 belongs to any other cluster (e.g., Cp2), which is merged into Cp1 at step 522. For example, A2 might belong to a cluster with D2 based on another call relationship, which was identified in a different iteration of the algorithm, such that the cluster with A2 and D2 is merged into the cluster of C3. If P2 is not a part of any other cluster, then P2 is added to Cp1 at step 524.

If P2 does not have a call relationship with P1, then the algorithm proceeds to making a determination at step 526, which is also executed after either P2 or a cluster of P2 is merged to Cp1. At step 526, a determination is made as to whether any other locations are included within the plurality from which P1 was selected. For example, a determination might be made as to whether there are any other locations within table 247.

If there are other locations within the plurality, the process repeats at step 516 by selecting another location. For example, location E2 listed in table 247 might be analyzed using steps 516 thru 526.

If at 526 it is determined that no other locations exist to analyze for a call relationship, the algorithm proceeds to step 528. At step 528 the centroid of Cp1 is calculated. For example, point 318 in box 316 of FIG. 3 represents a centroid. At step 530 a size of Cp1 is calculated, such as by calculating a maximum distance from the centroid to a location included in Cp1. This maximum distance might represent a radius of Cp1, and line 322 in box 316 represents an exemplary size measurement of a cluster. At step 532 another location ("M") from among the plurality is selected that is not already included in Cp1. For example, location B2 might be selected that is in table 247 and that does not have a call relationship with C3, A2, D2, or C2.

At step 534 a determination is made as to whether M is within a threshold distance away from the centroid. The threshold distance might be the maximum distance from the centroid to a point of Cp1. In addition, the threshold distance might include the maximum distance multiplied by a constant (e.g., alpha) to adjust the sensitivity of the algorithm to detect possibly related locations. For example, a determination might be made that B2 is within a threshold distance (e.g., line 322) of the centroid 312.

If M is within the threshold distance, then another determination is made at 536 as to whether M belongs to any other cluster (e.g., Cm), which is merged into Cp1 at step 538. For example, B2 might belong to a cluster with E2 based on another call relationship, such that the cluster with B2 and E2 is merged into Cp1. If M is not a part of any other cluster, then M is added to Cp1 at step 540.

If M is not within the threshold distance, then the algorithm proceeds to making a determination at step 542, which is also executed after either M or a cluster Cm of M is merged to Cp1. At step 542, a determination is made as to whether any other locations are included within the plurality from which P1 and M were selected. For example, a determination might be made as to whether there are any other locations within table 247.

If there are other locations within the plurality, the process repeats at step 528 and 530 by recalculating the centroid and size to account for the addition of M or Cm and selecting another location at step 532. For example, location E4 listed in table 247 might be analyzed using steps 532 thru 542.

Locations that were previously analyzed at step 518 and found to have no call relationship might be re-analyzed using steps 532 thru 542.

If at 542 it is determined that no other locations exist to analyze for a distance-based relationship, the algorithm proceeds to step 543. At step 543 another determination is made as to whether there exists any location among the plurality (i.e., from which P1 was selected) that is not included in a cluster. If there does exist any unclustered location, the algorithm starts at step 512 and a new cluster is formed. For example, referring to FIGS. 2-4, G1 might have been selected at step 518 prior to G1 ever being clustered, such as with G2. Accordingly, the process might proceed through step 542 with G1 having been analyzed, but never clustered. In such a scenario, the algorithm returns to step 512 and a cluster is formed using any location that is not already a member of a cluster. If G1 ultimately joins a different cluster, which includes some location having a call relationship or distance-based relationship to Cp1, then G1 and the different cluster also join Cp1. However, G1 might alternatively join a different cluster, which fails to include any location having a call relationship or distance-based relationship with Cp1, such that G1 and the different cluster remain discrete from Cp1.

If at 543 it is determined that no unclustered location exists, the algorithm proceeds to step 544. At step 544 a determination is made as to whether there exists more than one cluster created from among the plurality of locations. For example, a determination is made as to whether Cp1 exists, in addition to another cluster that does not include any locations sharing a call relationship with a location of Cp1 or any locations located within a threshold distance. The existence of more than one cluster suggests unauthorized use of an account and can serve as a basis to trigger an unauthorized use response.

Figure 6:
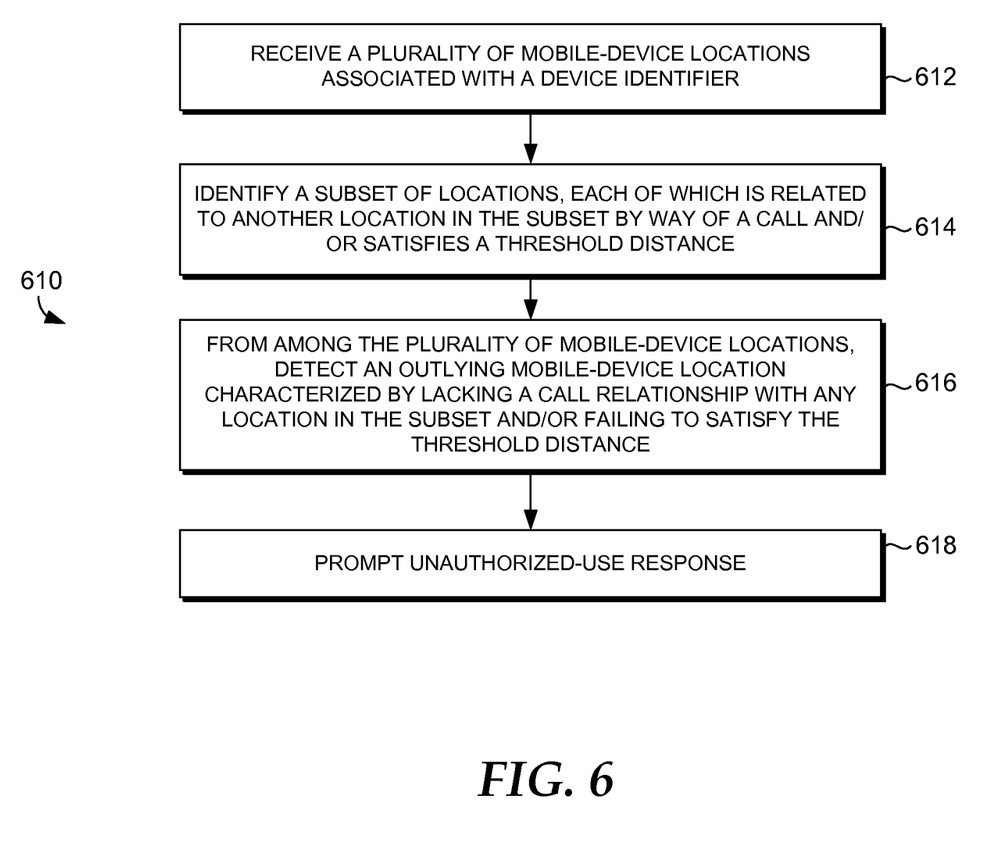

Now referenced is FIG. 6, which depicts an exemplary method of detecting that a device identifier that identifies an authorized mobile device has been used by an unauthorized mobile device to utilize telecommunications services. In describing FIG. 6, reference might also be made to FIGS. 1-5. For example, telecommunication services might include services provided by network 220, an authorized mobile device might include mobile device 224, and an unauthorized mobile device might include mobile device 226. FIG. 6 depicts a method that is generally identified by reference numeral 610. One embodiment of the present invention is directed to one or more computer-readable media having computer-executable instructions embodied thereon that, when executed, perform method 610. Application 260 represents a set of such computer-executable instructions and is depicted in an exploded view 262 for illustrative purposes. Exploded view 262 depicts a method 264 that, when executed, detects that an identifier that identifies mobile device 224 has been used by unauthorized mobile device 226.

Step 612 of method 610 includes receiving a plurality of mobile-device locations associated with a device identifier, wherein each mobile-device location describes a given location at which a respective mobile device engaged in a respective communications instance. For example, in step 266 fraud detector 256 might receive mobile-device locations listed in records of set 214 (FIG. 2), such as those locations depicted in table 247. As previously described, box 312 (FIG. 3) likewise includes locations listed in records of set 214 that might be received by fraud detector 256.

Step 614 includes identifying a subset of locations from the plurality of mobile-device locations, wherein each location in the subset is related to another location in the subset by way of a call and/or satisfies a distance threshold. For example, in step 268 fraud detector 256 might identify a subset of locations that includes locations C3 and A2. Moreover, fraud detector might identify a larger subset of locations that are related by way of multiple calls, such as C3, A2, D2, and C2. An exemplary subset is depicted in box 316 inside circle 321. Circle 321 includes locations related by way of calls and locations (e.g., inside circle 321) that satisfy a threshold distance.

Step 616 includes, from among the plurality of mobile-device locations, detecting an outlying mobile-device location that is characterized by lacking a call relationship with any location in the subset and/or failing to satisfy the threshold distance. For example, in step 270 fraud detector 256 might analyze call relationships of location G1, which includes is related to G2 by way of a call, and determine that neither G1 nor G2 are related to any other location of the subset of locations (e.g., locations inside circle 321).

Although method 610 lists step 614, fraud detector 256 might not actively identify a subset of related mobile-device locations. Alternatively, fraud detector 256 might simply, from among the plurality of mobile-device locations, detect an outlying mobile-device location that is characterized by lacking a call relationship with another location of the plurality. Moreover, as described above with respect to FIG. 4, an outlying mobile-device location might be characterized by identifying a location that fails to satisfy a threshold distance.

Step 618 of method 610 includes providing an unauthorized-use response when the outlying mobile-device location is detected. An unauthorized-use response might include a variety of actions. Exemplary unauthorized-use responses include flagging an account of the authorized mobile device to indicate possible unauthorized use; sending an alert or providing a visual cue; suspending or terminating services; or a combination thereof. Referring to FIG. 2, in step 272, fraud detector 256 provides an unauthorized-use response.

Figure 7:
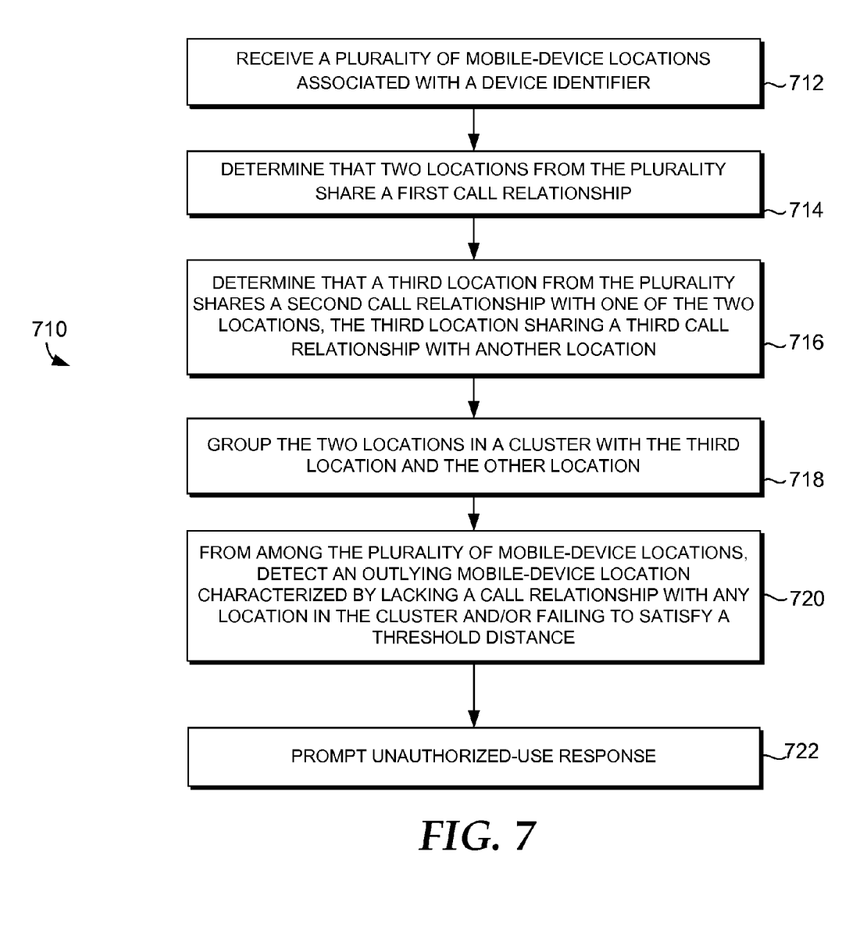

Now referenced is FIG. 7, which depicts an exemplary method of detecting that a device identifier that identifies an authorized mobile device has been used by an unauthorized mobile device to utilize telecommunications services. In describing FIG. 7, reference might also be made to FIGS. 1-5. For example, telecommunication services might include services provided by network 220, an authorized mobile device might include mobile device 224, and an unauthorized mobile device might include mobile device 226. FIG. 57 depicts a method that is generally identified by reference numeral 710. One embodiment of the present invention is directed to one or more computer-readable media having computer-executable instructions embodied thereon that, when executed, perform method 710. Application 260 represents a set of such computer-executable instructions.

Step 712 of method 710 includes receiving a plurality of mobile-device locations associated with the device identifier, wherein each mobile-device location describes a given location at which a respective mobile device engaged in a respective communications instance. As such, step 712 is similar to step 612, such that fraud detector 256 might receive mobile-device locations listed in records of set 214 (FIG. 2), including those locations depicted in table 247. As previously described, box 312 (FIG. 3) likewise includes locations listed in records of set 214 that might be received by fraud detector 256.

Step 714 includes determining that two locations from the plurality of mobile-device locations share a first call relationship. For example, it might be determined that locations C3 and A2 share a first call relationship. Step 716 includes determining that a third location from the plurality of mobile-device locations shares a second call relationship with one of the two locations, wherein the third location also shares a third call relationship with another location. For example, it might be determined that D2 (a third location) shares a call relationship with A2, location D2 also sharing a call relationship with location C2. Step 718 includes grouping the two locations in a cluster with the third location and the other location. As such, continuing with the example, step 718 might include grouping locations C3 and A2 in a cluster (i.e., subset) with locations D2 and C2.

Step 720 includes, from among the plurality of mobile-device locations, detecting an outlying mobile-device location that is characterized by lacking a call relationship with any location of the cluster and/or failing to satisfy a threshold distance (e.g., city-limit boundary). Step 720 is similar to step 616, such that in an exemplary embodiment locations G1 and G2 are analyzed and a determination is made that neither G1 nor G2 are related to any other location of the subset of locations (e.g., C3, A2, D2, and C2). Similar to step 618, step 722 includes providing an unauthorized-use response when the outlying mobile-device location is detected.

Methods 610 and 710 might be performed in various circumstances. For example, methods 610 and 710 might be performed in real time as each record (e.g., 216) is generated that includes mobile-device locations. Alternatively, method 610 might be performed at scheduled intervals, such as daily, weekly, or monthly.

In another embodiment, detection of an outlying mobile-device location as described herein is only one factor that is considered when determining that fraudulent activity might be occurring. For example, the inventors have described various other fraud-detection methods (i.e., unauthorized-use-detection methods) in U.S. patent application Ser. Nos. 12/706,864; 12/775,579; 12/839,893; 12/940,215; and 12/940,194. Each of U.S. application Ser. Nos. 12/706,864; 12/775,579; 12/839,893; 12/940,215; and 12/940,194 is hereby expressly incorporated herein by reference in its entirety. Any of the various fraud-detection methods described in U.S. application Ser. Nos. 12/706,864; 12/775, 579; 12/839,893; 12/940,215; and 12/940,194 might be used in any combination to determine when fraudulent activity is occurring. That is, the methods described herein might be combined with one or more of the alternative methods described in U.S. application Ser. Nos. 12/706,864; 12/775, 579; 12/839,893; 12/940,215; and 12/940,194. For example, detecting an outlying mobile-device location might in and of itself be sufficient to suggest that a device has been cloned. However, a stronger fraudulent-activity inference might be drawn if both an outlying mobile-device location is identified and a mobile-device-location entropy increases over a period of time, as described in U.S. application Ser. No. 12/839,893.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A method of detecting that a device identifier that identifies a first mobile device has been used by a second mobile device to utilize telecommunication services, the method comprising:

receiving a plurality of mobile-device locations associated with the device identifier, wherein the plurality of mobile-device locations describe locations at which the first mobile device and the second mobile device engaged in a communications instances;

identifying a subset of locations from the plurality of mobile-device locations,
wherein each location in the subset either is related to a another location in the subset by way of a call, satisfies a threshold distance, or a combination thereof, and
wherein the subset of locations forms a geographical grouping;

from among the plurality of mobile-device locations, detecting an outlying mobile-device location that is characterized by either lacking a call relationship with any location in the subset, failing to satisfy the threshold distance, or a combination thereof, wherein the threshold distance comprises an approximate radius of the geographical grouping; and providing an unauthorized-use response when the outlying mobile-device location is detected based on an inference that the second mobile device is using the device identifier.

2. The method of claim 1, wherein each communications instance includes facilitating a voice call, exchanging a voicemail message, exchanging a text message, exchanging an instant message, exchanging an email message, or facilitating a data call.

3. The method of claim 1, wherein each mobile-device location of the plurality includes either a starting location at which a respective mobile device was located when a respective communications instance was initiated or an ending location at which the respective mobile device was located when the respective communications instance was terminated.

4. The method of claim 1, wherein each location includes a geographical coordinate, a base-station location of a cell, or a centroid of a cell sector.

5. The method of claim 1, wherein a location is characterized as related to the other location when a communications instance either starts at the location and ends at the other location or starts at the other location and ends at the location.

6. The method of claim 1, wherein detecting the outlying mobile-device location includes determining that more than one discrete mobile-device-location cluster exists among the plurality of locations.

7. The method of claim 1, wherein the unauthorized-use response includes flagging the account, sending an alert, suspending services, or a combination thereof.

8. Non-transitory computer-readable media having computer-executable instructions embodied thereon that, when executed, perform a method of detecting that a device identifier that identifies a first mobile device has been used by a second mobile device to utilize telecommunication services, the method comprising:

receiving a plurality of mobile-device locations associated with the device identifier,
wherein the plurality of mobile-device locations indicate locations at which the first mobile device and the second mobile device engaged in communications instances, and
wherein the plurality of mobile-device locations includes a subset of locations, each of which either is related to another location of the subset by way of a call, satisfies a threshold distance, or a combination thereof, the subset of locations forming a geographic grouping;

calculating a radius of the geographic grouping;

from among the plurality of mobile-device locations, detecting an outlying mobile-device location that is characterized by lacking a call relationship with any location in the subset of locations and falling outside the radius that is calculated; and providing an unauthorized-use response when the outlying mobile-device location is detected based on an inference that the second mobile device is using the device identifier.

9. The computer-readable media of claim 8, wherein a communications instance includes facilitating a voice call, exchanging a voicemail message, exchanging a text message, exchanging an instant message, exchanging an email message, or facilitating a data call.

10. The computer-readable media of claim 8, wherein the outlying mobile-device location is characterized by being located beyond a threshold distance away from an approximate center of the geographical grouping.

11. The computer-readable media of claim 10, wherein the approximate center is determined by:
  (a) representing each location of the geographical grouping as a respective first coordinate and a respective second coordinate;
  (b) determining a first-coordinate mean based on all respective first coordinates of the subset; and
  (c) determining a second-coordinate mean based on all respective second coordinates of the subset, and
wherein the approximate center is represented by the first-coordinate mean and the second-coordinate mean.

12. The computer-readable media of claim 10, wherein the threshold distance is equal to the approximate radius of the geographical grouping.

13. The computer-readable media of claim 10, wherein the threshold distance is equal to a product of an approximate radius of the geographical grouping multiplied by a constant.

14. The computer-readable media of claim 8, wherein the unauthorized-use response includes flagging the account, sending an alert, suspending services, or a combination thereof.

15. Non-transitory computer-readable media having computer-executable instructions embodied thereon that, when executed, perform a method of detecting that a device identifier that identifies an authorized mobile device has been used by an unauthorized mobile device to utilize telecommunication services, the method comprising:

receiving a plurality of mobile-device locations associated with the device identifier, wherein each mobile-device location describes a given location at which a respective mobile device engaged in a respective communications instance;

determining that two locations from the plurality of mobile-device locations share a first call relationship;

determining that a third location from the plurality of mobile-device locations shares a second call relationship with one of the two locations, wherein the third location shares a third call relationship with another location;

grouping the two locations in a cluster with the third location and the other location;

from among the plurality of mobile-device locations, detecting an outlying mobile-device location that is characterized by either lacking a call relationship with any location of the cluster, failing to satisfy a threshold distance, or a combination thereof; and providing an unauthorized-use response when the outlying mobile-device location is detected.

16. The computer-readable media of claim 15, wherein the threshold distance includes a geographical boundary and wherein the location fails to satisfy the threshold distance when the location is outside the geographical boundary.

17. The computer-readable media of claim 15, wherein the outlying mobile-device location is characterized by being located beyond the threshold distance away from an approximate center of a geographical grouping of the cluster.

18. The computer-readable media of claim 15, wherein the unauthorized-use response includes flagging the account, sending an alert, suspending services, or a combination thereof.

* * * * *